INVENTORS.
JONATHAN K. YU
DARRELL L. FETT
BY Lloyd B. Guernsey
AGENT

United States Patent Office 3,539,824
Patented Nov. 10, 1970

3,539,824
CURRENT-MODE DATA SELECTOR

Jonathan K. Yu and Darrell L. Fett, Phoenix, Ariz., assignors to General Electric Company, a corporation of New York Filed Sept. 3, 1968, Ser. No. 756,945
Int. Cl. H03k *19/22*
U.S. Cl. 307—218 10 Claims

ABSTRACT OF THE DISCLOSURE

A plurality of transistors in a current-mode circuit uses control signals to select data from a plurality of sources of data and provides true and complementary output signals.

BACKGROUND OF THE INVENTION

This invention relates to logic gates and more particularly to current-mode logic gates which can be used as data selectors in data processing systems.

Data selectors are used in high speed data processing systems to control the flow of information to various portions of the processing system. Prior arts data selectors may be a combination of AND-gates, OR-gates and inverters. The AND-gate provides the logical operation of conjunctive AND for binary 1 signals applied thereto. The AND-gate provides a positive output signal representing a binary 1 when, and only when, all of the input signals applied thereto are positive and represent binary 1's. When any one or more of the input signals represent binary 0's, the output signal represents a binary 0. The OR-gates provide the logical operation of inclusive OR for binary signals applied thereto. The OR-gate provides a positive output signal representing a binary 1 when any one of the input signals applied thereto represents a binary 1. When none of the input signals represent a binary 1 the output signal represents a binary 0. An inverter provides a logical operation of inversion for an input signal applied thereto. The inverter provides a positive output signal representing a binary 1 when the input signal applied thereto is negative representing a binary 0. Conversely, the inverter provides an output signal representing a binary 0 when the input signal is positive representing a binary 1.

In many prior art data selectors the outputs of a plurality of AND-gates are applied to the input of an OR-gate to provide the desired function. Each of these AND-gates and each of these OR-gates is a separate circuit so that several circuits are required to make up the data selector. This causes data processing systems using the prior art data selectors to be bulky and expensive to construct. The present invention alleviates the disadvantages of the prior art by providing a data selector in a single circuit. This eliminates the need for separate AND-gates and OR-gates and thus reduces the size and expense of building a high speed data processing system.

The AND-gates and the OR-gates used in the prior art data selectors employ transistors in circuits which require relatively large values of input signals in order to provide logic output signals which are not seriously affected by noise in the data processing system. Semiconductors used in transistors store electrical charges during the time an input signal causes a transistor to be in a conductive condition. These charges must be supplied to the transistor in order to render the transistor conductive and these charges must be removed to render the transistor nonconductive after it has been conductive. The amount of these charges and the time required to supply and remove these charges is dependent upon the value of the input signal. The relatively large values of input signals used in prior art data selectors cause relatively large amounts of charge to be stored in the transistors and cause the prior art data selectors to be relatively slow. The large value of input signals used in the prior art data selectors also causes relatively large amounts of power to be dissipated in the transistors which are used in the data selectors. The present invention further alleviates the disadvantages of a prior art data selector by requiring input signals which are less than twenty-five percent of the value of the input signals required in these prior art data selectors. This reduces the power dissipation in the data selector and increases the speed of operation of the data selector.

Each of the AND-gates and each of the OR-gates used in the prior art data selectors is a separate circuit. Each of these circuits dissipates electrical power caused by current flow in the various components of the circuit. Also, each of the AND-gates and each of the OR-gates employ transistors which produce a time delay due to the time required to supply and remove electrical charges stored in the transistors. The transistors in the AND-gates produce a time delay and the transistors in the OR-gates produce additional time delay. Thus, the total time delay in the prior art data selectors is greater than the time delay in a single circuit. The present invention alleviates the disadvantages of the prior art data selector by using a single circuit. This reduces the power dissipation and reduces the time delay and increases the speed of operation of the data selector.

It is, therefore, an object of this invention to provide a new and improved data selector.

Another object of this invention is to provide a current-mode data selector having greatly reduced power dissipation.

A further object of this invention is to provide a current-mode data selector which uses small values of input signals.

Still another object of this invention is to provide a data selector having an increased speed of operation.

Another object of this invention is to provide a current-mode data selector which develops true and complementary logic signals.

SUMMARY OF THE INVENTION

The foregoing objects are achieved in the instant invention by providing a data selector which provides the functions of AND-gates and an OR-gate in a single circuit. This reduces the time delay and reduces the amount of power dissipated in the data selector. The data selector also has means for providing both true and complementary output signals.

Other objects and advantages of this invention will become apparent from the following description when taken in connection with the accompanying drawings.

Figure 1:
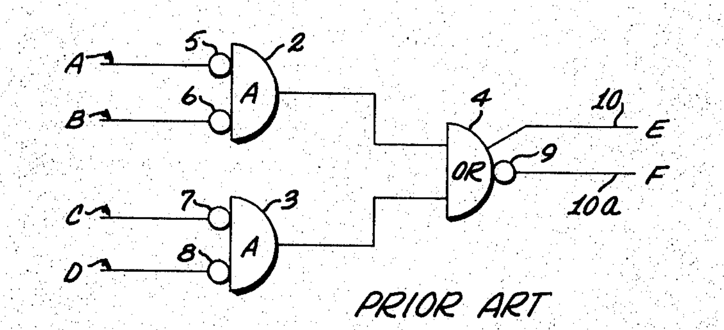
FIG. 1 is a diagram of a prior art data selector using AND-gates and an OR-gate.

The prior art data selector shown in FIG. 1 employs a pair of AND-gates 2 and 3, an OR-gate 4 and a plurality of inverters 5–9. Signals such as those shown in waveforms A, B, C and D of FIG. 4 may be applied to the input leads to obtain the waveforms E and F of FIG. 4 on the output leads. When a low value of voltage representing a binary 0 is applied to both of the input leads of AND-gate 2, inverters 5 and 6 provide a positive value of voltage, representing a binary 1, to AND-gate 2. The output signal from AND-gate 2 is positive, representing a binary 1. This positive voltage causes OR-gate 4 to produce a positive voltage, representing a binary 1 on output lead 10. Inverter 9 converts the binary 1 to a binary 0 at output lead 10*a*. In the same manner, a voltage representing a binary 0 on both of the input leads of AND-gate 3 produces a voltage representing a binary 1 at output lead 10 and a voltage representing a binary 0 at output lead 10*a*.

If the voltage applied to either inverter 5 or inverter 6 is positive, AND-gate 2 provides a low value of voltage representing a binary 0 to OR-gate 4. If the voltage applied to either inverter 7 or inverter 8 is also positive, AND-gate 3 also provides a low value of voltage, representing a binary 0 to OR-gate 4. OR-gate 4 produces a low voltage, representing a binary 0 on output lead 10 and a positive voltage, representing a binary 1 on output lead 10*a*.

When signals are applied to the input leads of AND-gates 2 and 3 there is a time delay before a signal is applied to the input leads of OR-gate 4. There is also a delay between the time a signal is applied to the input leads of OR-gate 4 and the time a signal is applied to output leads 10 and 10*a*.

DESCRIPTION OF THE PREFERRED EMBODIMENT

Figure 2:
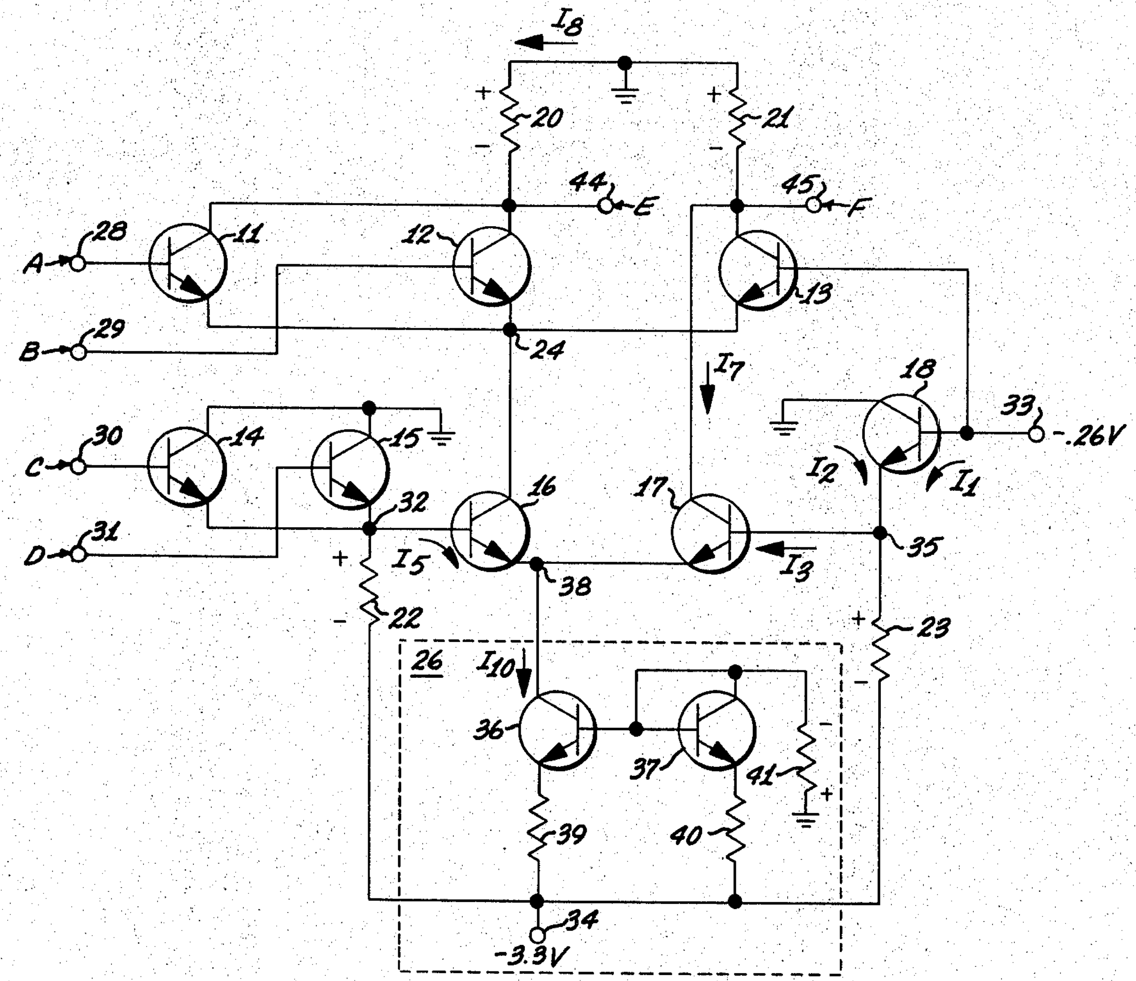
FIG. 2 is a circuit diagram of one embodiment of the instant invention.

The current-mode data selector shown in FIG. 2 includes a plurality of transistors 11–18 each having a control electrode or base, a first output electrode or emitter and a second output electrode or collector. The collectors of transistors 11 and 12 are coupled through a resistor 20 to a first reference potential represented by ground in FIG. 2. The emitters of transistors 11 and 12 are coupled to the collector of transistor 16 and to the emitter of transistor 13. The collectors of transistors 14 and 15 are connected to the first reference potential and the emitters of transistors 14 and 15 are connected to the base of transistor 16. Transistors 14 and 15 supply current to the base of transistor 16 so that transistor 16 is rendered conductive when either transistor 14 or transistor 15 is conductive. The collectors of transistors 13 and 17 are coupled through a resistor 21 to the first reference potential and the emitters of transistors 16 and 17 are connected to a constant-current source 26. A plurality of signal-input terminals 28–31 are each connected to a corresponding one of the bases of transistors 11, 12, 14 and 15. The bases of transistors 13 and 18 are each coupled to a terminal 33 which is connected to a second reference potential or source of voltage represented by the —.26 volt notation in FIG. 1. The collector of transistor 18 is connected to ground and the emitters of transistors 14 and 15 are coupled through a resistor 22 to a terminal 34 which is connected to a third reference potential or source of voltage represented by the —3.3 volt notation. The base of transistor 17 and the emitter of transistor 18 are each coupled through a resistor 23 to terminal 34.

The constant-current source 26 includes a pair of transistors 36 and 37 each having a control electrode or base, a first output electrode or emitter and a second output electrode or collector. The emitters of transistors 36 and 37 are coupled to terminal 34 by resistors 39 and 40 respectively. The collector of transistor 37 and the bases of transistors 36 and 37 are each coupled through a resistor 41 to the first reference potential.

Transistors 36 and 37 are selected so that their operating characteristics are substantially identical and resistors 39 and 40 have values which are substantially identical. This selection of transistors and resistors causes current through transistor 36 to be substantially constant even when voltage across the constant-current source 26 changes. This selection of transistors also causes current through transistor 36 to be constant when the $\beta$ or current gain of the transistor changes due to temperature changes.

The base and the collector of transistor 37 are connected together so that the transistor operates as a diode to establish a reference voltage at the base of transistor 36. The relative values of resistors 40 and 41 determine the value of the reference voltage at the base of transistor 36. The value of the voltage at the base of transistor 36 and the value of resistor 39 determine the value of current between base and emitter of transistor 36. The value of the current between base and emitter of transistor 36 and the $\beta$ or current gain of transistor 36 determine the value of the current $I_{10}$ flowing between collector and emitter of transistor 36. When base to emitter current is constant and $\beta$ is constant, the collector to emitter current $I_{10}$ of transistor 36 is constant.

The constant-current source 26 also has means for providing a constant value of collector to emitter current through transistor 36 even when the $\beta$ of transistor 36 changes due to temperature changes. The operating characteristics of transistors 36 and 37 are substantially identical so the $\beta$ of transistor 36 is equal to the $\beta$ of transistor 37. When the $\beta$ of transistor 36 changes due to a change in temperature, the $\beta$ of transistor 37 also changes. For example, when the $\beta$ of transistor 36 increases, the $\beta$ of transistor 37 increases. An increase in the $\beta$ of transistor 36 tends to increase collector current $I_{10}$ of transistor 36. However, an increase in the $\beta$ of transistor 37 increases the collector to emitter current in transistor 37 which increases the current through resistor 41 and increases the voltage drop across resistor 41. An increase in the voltage drop across resistor 41 causes a decrease in the voltage at the base of transistor 36. A decrease in the voltage at the base of transistor 36 causes a decrease in the base to emitter current in transistor 36 so that the collector to emitter current in transistor 36 remains substantially constant even when the $\beta$ of the transistor increases.

The potential at terminal 33 causes a current $I_1$ to flow from terminal 33 through base to emitter of transistor 18 through resistor 23 to terminal 34. The current $I_1$ renders transistor 18 conductive so that a current $I_2$ flows from ground through collector to emitter of transistor 18, through resistor 23 to terminal 34. When transistor 18 is rendered conductive, the voltage drop between collector and emitter is approximately +.96 volt so that the voltage at junction point 35 is approximately —.96 volt. This voltage at junction point 35 causes a current $I_3$ to flow from base to emitter of transistor 17 when transistor 16 is nonconductive. Current $I_3$ renders transistor 17 conductive. When transistor 16 is conductive the current through transistor 16 causes an increase in the voltage at emitters of transistors 16 and 17 so that transistor 17 is rendered nonconductive. The value of the reference potential at terminal 33 is selected so that transistor 17 is rendered conductive when transistor 16 is nonconductive and transistor 17 is nonconductive when transistor 16 is conductive.

Figure 4:
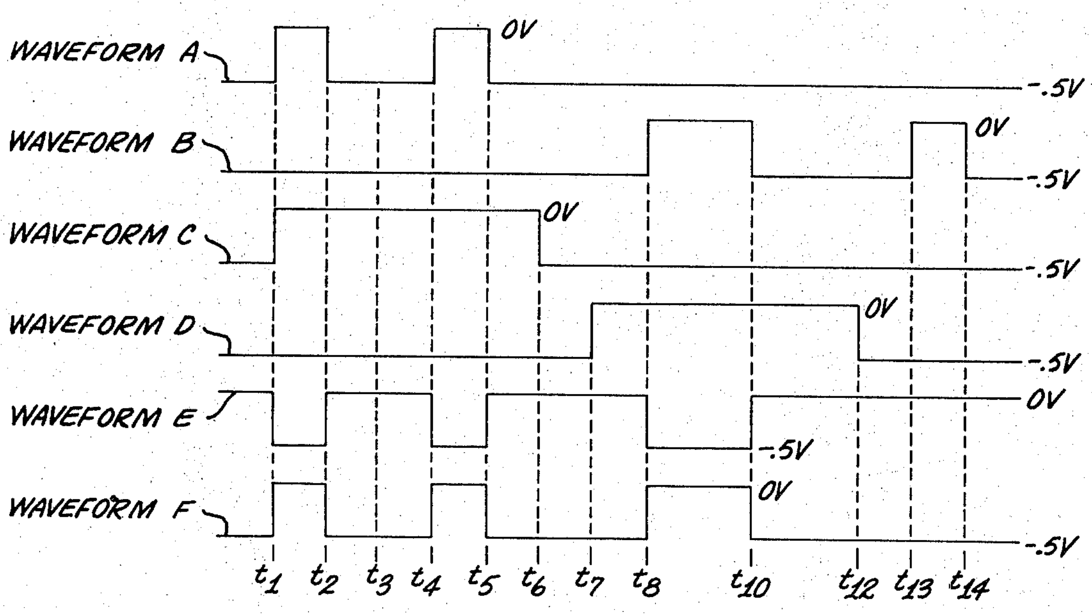
FIG. 4 illustrates waveforms which are useful in explaining the operation of the invention shown in FIGS. 2 and 3.

When transistor 16 is conductive and transistors 11 and 12 are nonconductive, the voltage at terminal 33 also causes a current to flow from base to emitter of transistor 13, through collector to emitter of transistor 16 through the constant current source 26 to terminal 34. For example, at time $t_3$ as shown in FIG. 4 a —.5 volt at the bases of transistors 11 and 12 cause transistors 11 and 12 to be nonconductive. A typical transistor requires approximately +.7 volt between the base and the emitter to cause the transistor to be rendered conductive. At time $t_3$ the —.26 volt at the base of transistor 13 is more positive than the —.5 volt at the bases of transistors 11 and 12. Transistor 13 is rendered conductive. The voltage at the emitter of transistor 13 is .7 volt more negative than the voltage at the base so that the voltage at the emitters of transistors 11, 12 and 13 is —.96 volt. The —.5 volt at the bases of transistors 11 and 12 cause transistors 11 and 12 to be nonconductive.

At time $t_4$ as shown in FIG. 4 the 0 volt at the base of transistor 11 causes transistor 11 to be rendered conductive. The voltage at the emitter of transistor 11 is approximately —.7 volt when transistor 11 is conductive so that transistor 13 is rendered nonconductive.

Transistor 16 is rendered conductive only when transistor 14 or transistor 15 is rendered conductive. When transistors 14 and 15 are both nonconductive there is no base current in transistor 16 so transistor 16 is nonconductive. When transistor 14, for example, is rendered conductive, a current flows from ground through collector to emitter of transistor 14 through resistor 22 to terminal 34. When transistor 14 is rendered conductive, the voltage drop between collector and emitter is approximately +.7 volt so that the voltage at junction point 32 is approximately —.7 volt. This voltage at junction point 32 causes a current $I_5$ to flow from junction point 32 through base to emitter of transistor 16, through constant-current source 26 to terminal 34. Current $I_5$ renders transistor 16 conductive.

It should be noted that a positive electrical signal on signal-input terminal 28 produces the same signal at output terminal 45 that is produced by a positive signal on signal-input terminal 29. When a positive signal is applied to either terminal 30 or terminal 31, a signal on terminal 28 or terminal 29 is gated through the data selector to output terminal 45.

The operation of the circuit of FIG. 2 may be more clearly seen by reference to the timing charts shown in FIG. 4. Prior to time $t_1$ shown in FIG. 4, a low value of voltage is applied to terminals 28, 29, 30 and 31 so that all of the transistors 11, 12, 14 and 15 are nonconductive. When transistors 14 and 15 are nonconductive, transistor 16 is nonconductive and transistor 17 is rendered conductive by the current supplied to the base of transistor 17 by transistor 18. When transistor 17 is conductive a current $I_7$ flows from ground through resistor 21 from collector to emitter of transistor 17 through the constant-current source to terminal 34. The current $I_7$ through resistor 21 provides a voltage drop of the polarity shown across transistor 21 so the voltage at output terminal 45 has a negative value.

At time $t_1$ the voltage applied at input terminal 28 increases as shown in waveform A in FIG. 4 so that transistor 11 is rendered conductive. At time $t_1$ the increased voltage at input terminal 30 causes transistor 14 to be rendered conductive which causes transistor 16 to be rendered conductive. If the value of voltage at signal terminal 30 is more positive than the voltage at terminal 33, the voltage at junction point 38 increases above the value of voltage which causes transistor 17 to be conductive. Thus, transistor 17 is rendered nonconductive when transistor 16 is conductive. At time $t_1$ the voltage at input terminal 28 causes transistor 11 to be rendered conductive. When transistor 11 is conductive, the voltage at junction point 24 increases so that transistor 13 is nonconductive. When transistors 13 and 17 are both nonconductive, current no longer flows through resistor 21 and the voltage at output terminal 45 increases as shown in waveform F of FIG. 4. When transistors 11 and 16 are both conductive, a current $I_8$ flows from ground through resistor 20 through collector to emitter of transistor 12 through collector to emitter of transistor 13 through the constant-current source to terminal 34. The current $I_8$ through resistor 20 provides a voltage drop of the polarity shown across resistor 20 so that the voltage at output terminal 44 decreases as shown in waveform E at time $t_1$.

At time $t_2$ a decrease in voltage at the signal-input terminal 28 causes transistor 11 to be rendered nonconductive. When transistor 11 is rendered nonconductive, current $I_8$ through resistor 20 decreases so that the voltage at terminal 44 increases. The time required for the voltage at terminal 44 to increase to a zero value is the time required to "turn off" or render the single transistor 11 nonconductive. In prior art data selectors it is necessary to render a first transistor nonconductive which causes a second transistor to be rendered nonconductive, etc. The total time required for an output voltage to change in a prior art data selector is the sum of the turn-off times of a plurality of transistors. Thus, the present invention has a speed of operation which is faster than prior art data selectors.

Figure 3:
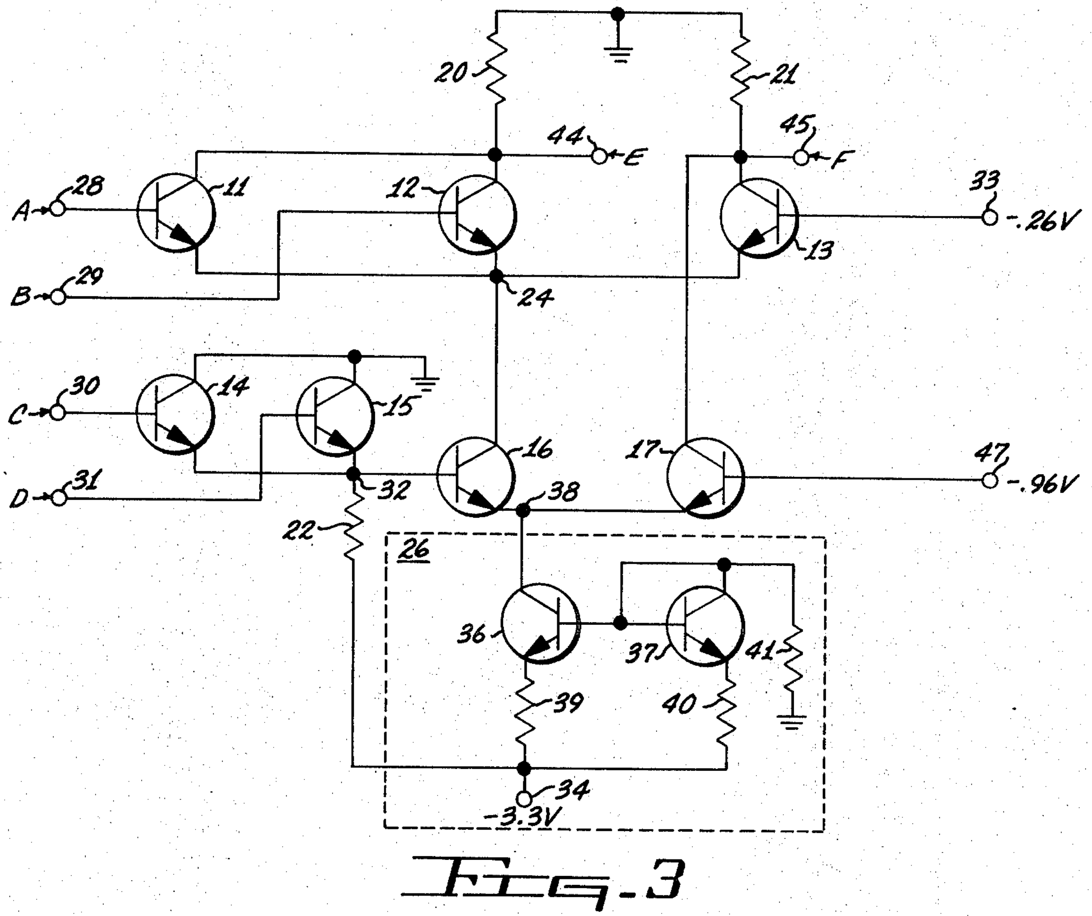
FIG. 3 is a circuit diagram of another embodiment of the instant invention.

FIG. 3 illustrates a second embodiment of the invention shown in FIG. 2 wherein like parts have similar reference characters. The circuit in FIG. 3 differs from the circuit of FIG. 2 in that a fourth reference potential or source of voltage represented by the —.96 volt notation has been substituted for the transistor 18 which supplied a reference potential to transistor 17 in the circuit of FIG. 2. The —.96 volt reference potential provides substantially the same value of voltage to the base of transistor 17 as is provided by the transistor 18 and the —.26 volt reference potential shown in FIG. 2.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, with the limits only of the true spirit and scope of the invention.

What is claimed is:

1. A current-mode data selector for selecting one source of data from a plurality of sources and for providing true and complementary logic signals, said selector comprising: first, second, third, fourth and fifth transistors each having a base, a collector and an emitter; first and second signal-input terminals, said first terminal being connected to said base of said first transistor, said second terminal being connected to said base of said third transistor; first, second, third and fourth reference potentials; first and second resistors, said first resistor being connected between said collector of said first transistor and said first potential, said second resistor being connected between said collector of said second transistor and said first potential, said collector of said third transistor being connected to said first potential, said emitter of said third transistor being connected to said base of said fourth transistor, said emitters of said first and said second transistors being connected to said collector of said fourth transistor, said base of said second transistor being coupled to said second potential, said base of said fifth transistor being coupled to said fourth potential, said collector of said fifth transistor being connected to said collector of said second transistor; resistive means connected between said third potential and said emitters of said fourth and said fifth transistors; and first and second output terminals, said first output terminal being connected to said collector of said first transistor, said second output terminal being connected to said collector of said second transistor.

2. A current-mode data selector for providing true and complementary logic signals as defined in claim 1 including: a third resistor, said third resistor being connected between said third potential and said base of said fourth transistor.

3. A current-mode data selector for selecting one source of data from a plurality of sources and for providing true and complementary logic signals, said selector comprising: first, second, third, fourth, fifth, sixth and seventh transistors each having a base, a collector and an emitter; first, second, third and fourth signal-input terminals, said first terminal being connected to said base of said first transistor, said second terminal being connected to said base of said third transistor, said third terminal being connected to said base of said sixth transistor, said fourth terminal being connected to said base of said seventh transistor; first, second, third and fourthe reference potentials; first and second resistors, said first resistor being connected between said first potential and said collectors of said first and said sixth transistors, said second resistor being connected between said first potential and said collector of said second transistor, said collectors of said third and said seventh transistors being connected to said first potential, said emitters of said third and said seventh transistors being connected to said base of said fourth transistor, said emitters of said first, said second and said sixth transistors being connected to said collector of said fourth transistor, said base of said second transistor being coupled to said second potential, said base of said fifth transistor being coupled to said fourth potential, said collector of said fifth transistor being connected to said collector of said second transistor; resistive means connected between said third potential and said emitters of said fourth and said fifth transistors; said first and second output terminal, said first output terminal being connected to said collector of said first transistor, said second output terminal being connected to said collector of said second transistor.

4. A current-mode data selector for providing true and complementary logic signals as defined in claim 3 including: a third resistor, said third resistor being connected between said third potential and said base of said fourth transistor.

5. A current-mode data selector for selecting one source of data from a plurality of sources and for providing true and complementary logic signals, said selector comprising: first, second, third, fourth, fifth, sixth, seventh and eighth transistors each having a base, a collector and an emitter; first, second, third and fourth signal-input terminals, said first terminal being connected to said base of said first transistor, said second terminal being connected to said base of said third transistor, said third terminal being connected to said base of said sixth transistor, said fourth terminal being connected to said base of said seventh transistor; first, second and third reference potentials; first and second resistors, said first resistor being connected between said first potential and said collectors of said first and said sixth transistors, said second resistor being connected between said first potential and said collector of said second transistor, said first potential being connected to said collectors of said third and said seventh transistors, said base of said fourth transistor being connected to said emiters of said third and said seventh transistors, said collector of said fourth transistor being connected to said emitters of said first, said second and said sixth transistors, said second potential being coupled to said bases of said second and said eighth transistors, said collector of said eighth transistors being connected to said first potential, said emitter of said eighth transistor being connected to said base of said fifth transistors, said collector of said fifth transistor being connected to said collector of said second transistor; resistive means connected between said third potential and said emitters of said fourth and said fifth transistors; first and second output terminals, said first output terminal being connected to said collector of said first transistor, said second output terminal being connected to said collector of said second transistor.

6. A current-mode data selector for providing true and complementary logic signals as defined in claim 5 including: third and fourth resistors, said third resistor being connected between said third potential and said base of said fourth transistor, said fourth resistor being connected between said third potential and said base of said fifth transistor.

7. A current-mode data selector for selecting one source of data from a plurality of sources and for providing true and complementary logic signals, said selector comprising: first, second, third, fourth, fifth and sixth transistors each having a base, a collector and an emitter; first and second signal-input terminals, said first terminal being connected to said base of said first transistor, said second terminal being connected to said base of said third transistor; first and second reference potentials; first and second resistors, said first resistor being connected between said collector of said first transistor and said first potential, said second resistor being connected between said collector of said second transistor and said first potential, said collector of said third transistor being connected to said first potential, said emitter of said third transistor being connected to said base of said fourth transistor, said emitters of said first and said second transistors being connected to said collector of said fourth transistor, said bases of said second and said sixth transistors being coupled to said second potential, said emitter of said sixth transistor being connected to said base of said fifth transistor, said collector of said sixth transistor being connected to said first potential, said collector of said fifth transistor being connected to said collector of said second transistor; a constant-current source, said source being connected to said emitters of said fourth and said fifth transistors; first and second output terminals, said first output terminal being connected to said collector of said first transistor, said second output terminals being connected to said collector of said second transistor.

8. A current-mode data selector for selecting one source of data from a plurality of sources and for providing true and complementary logic signals, said selector comprising: first, second, third, fourth, fifth and sixth transistors each having a base, a collector and an emitter; first and second signal-input terminals, said first terminal being connected to said base of said first transistor, said second terminal being connected to said base of said third transistor; first, second and third reference potentials; first, second, third and fourth resistors; said first resistor being connected between said collector of said first transistor and said first potential, said second resistor being connected between said collector of said second transistor and said first potential, said collector of said third transistor being connected to said first potential, said emitter of said third transistor being connected to said base of said fourth transistor, said emitters of said first and said second transistors being connected to said collector of said fourth transistor, said third resistor being connected between said third potential and said base of said fourth transistor, said fourth resistor being connected between said third potential and said base of said fifth transistor, said bases of said second and said sixth transistors being coupled to said second potential, said emitter of said sixth transistor being connected to said base of said fifth transistor, said collector of said sixth transistor being connected to said first potential, said collector of said fifth transistor being connected to said collector of said second transistor; a constant-current source, said source being connected to said emitters of said fourth and said fifth transistors; first and second output terminals, said first output terminal being connected to said collector of said first transistor, said second output terminal being connected to said collector of said second transistor.

9. A current-mode data selector for selecting one source of data from a plurality of sources and for providing true and complementary logic signals, said selector comprising: first, second, third, fourth, fifth, sixth, seventh and eighth transistors each having a base, a collector and an emitter; first, second, third and fourth signal-input terminals, said first terminal being connected to said base of said first transistor, said second terminal being connected to said base of said third transistor, said third terminal being connected to said base of said sixth transistor, said fourth terminal being connected to said base of said seventh transistor; first and second reference potentials; first and second resistors, said first resistor being connected between aid first potential and said collectors of said first and said sixth transistors, said second resistor being connected between said first potential and said collector of said second transistor, said first potential being connected to said collectors of said third and said seventh transistors, said base of said fourth transistor being connected to said emitters of said third and said seventh transistors, said collector of said fourth transistor being connected to said emitters of said first, second and sixth transistors, said second potential being coupled to said bases of said second and said eighth transistors, said collector of said eighth transistor being connected to said first potential, said emitter of said eighth transistor being connected to said base of said fifth transistor, said collector of said fifth transistor being connected to said collector of said second transistor; a constant-current source, said source being connected to said emitters of said fourth and said fifth transistors; first and second output terminals, said first output terminal being connected to said collector of said first transistor, said second output terminal being connected to said collector of said second transistor.

10. A current mode data selector for providing true and complementary logic signals as defined in claim 9 including: a third reference potential; third and fourth resistors, said third resistor being connected between said third potential and said base of said fourth transistor, said fourth resistor being connected between said third potential and said base of said fifth transistor.

References Cited

UNITED STATES PATENTS 3,471,713 10/1969 Uimari ------------ 307—218

DONALD D. FORRER, Primary Examiner

D. M. CARTER, Assistant Examiner

U.S. Cl. X.R.

307—207, 215